United States Patent [19]
Schweitzer

[11] Patent Number: 6,079,897
[45] Date of Patent: Jun. 27, 2000

[54] RELEASABLE LOCK FOR BEARING ASSEMBLY

[75] Inventor: Ferdinand Schweitzer, Peter, Austria

[73] Assignee: SKF GmbH, Germany

[21] Appl. No.: 08/987,440

[22] Filed: Dec. 9, 1997

[30] Foreign Application Priority Data

Dec. 10, 1996 [DE] Germany ............................ 196 51 176

[51] Int. Cl.[7] .................................................. F16B 21/18
[52] U.S. Cl. .............................. 403/328; 403/2; 403/326; 285/4
[58] Field of Search .............................. 403/2, 326, 376; 285/3, 4, 2

[56] References Cited

U.S. PATENT DOCUMENTS

| | | | |
|---|---|---|---|
| 2,996,316 | 8/1961 | Terhune | 285/4 |
| 4,059,288 | 11/1977 | Mohr | 285/4 |
| 5,311,820 | 5/1994 | Ellingsen | 403/2 |

FOREIGN PATENT DOCUMENTS

| | | |
|---|---|---|
| 0678683A1 | 11/1995 | European Pat. Off. . |
| 780237 | 7/1955 | United Kingdom . |
| 779980 | 7/1957 | United Kingdom . |
| 1260523 | 3/1969 | United Kingdom . |

*Primary Examiner*—Anthony Knight
*Assistant Examiner*—Mark Williams
*Attorney, Agent, or Firm*—Eugene E. Renz, Jr. PC

[57] ABSTRACT

A locking mechanism for machine parts having aligned grooves comprising a spring ring engageable in the grooves of the machine parts in a locking position and wherein the material of the spring ring is weakened continuously in the circumferential direction at the juncture between the machine parts to define a predetermined breaking point.

5 Claims, 3 Drawing Sheets

RELEASABLE LOCK FOR BEARING ASSEMBLY

BACKGROUND OF THE INVENTION

Releasable locking mechanisms for machine parts are not broadly new per se. For example, German Patent DE 3,346,661 shows an assembly wherein the spring ring can be inserted into radial grooves in the bore and lateral surface of machine parts wherein both the surfaces of the bore and its outside surface are cylindrical. The ring thus can be used to lock the machine parts in the axial direction and can also be used to lock a shaft in a bore. It is noted that in this type of application, the radial grooves are made deep enough to hold the entire radial dimension of the spring ring. In this type of application, the radial grooves are made deep enough to receive the entire radial dimension so that the spring ring is completed seated within the groove. In other words, the depth of the groove is greater than the radial dimension of the spring ring. Accordingly, as the shaft is first inserted into the bore, the spring ring is pushed into one radial groove and upon completion of the assembly process, and it then snaps into the other radial groove in the shaft. Accordingly, since the spring ring is no longer accessible from the outside, the arrangement described above is considered a permanent installation.

SUMMARY OF THE INVENTION

With the foregoing in mind, it is an object of the present invention to provide an improved spring ring arrangement wherein the lock can be released without damage to the machine parts connected to one another. To this end, the material of the spring ring is weaken continuously in the circumferential direction at the level of the bore diameter so that the remaining material is designed to serve as a predetermined breaking point. A spring ring in accordance with the present invention fulfills all the functions required during operation. For example, it supports the maximum axial force which can occur without being damaged. Accordingly, the breaking load is therefore greater than the maximum axial load. The breaking load, however, is less than the load which causes damage to the radial grooves, especially to the flanks of the grooves. The weakening of the spring ring can be achieved by various means, so long as it extends in the circumferential direction. Thus, it is possible, for example, to form a circumferentially extending ring-shape groove in the annular side faces of the ring, wherein to provide a series of openings in certain sections thereof. The various alternatives all have in common the fact that they provide a weakened area extending circumferentially which functions as a predetermined breaking point during disassembly.

A break is produced along the ring-shaped grooves in the spring ring between the shaft and the bore part by exerting a pressing or striking force in the axial direction during disassembly. When this occurs, the shaft can be removed from the bore and the two parts of the severed spring ring can then be removed from the radial grooves. When it is desired to reassemble the machine parts, they can be connected to each other by simply installing a new spring ring in accordance with the present invention.

BRIEF DESCRIPTION OF THE DRAWINGS

These and other objects of the present invention and various features and details of the operation and construction thereof are hereinafter more fully set forth with reference to the accompanying drawings, wherein.

DETAILED DESCRIPTION OF THE PREFERRED EMBODIMENT

Figures 1, 2:
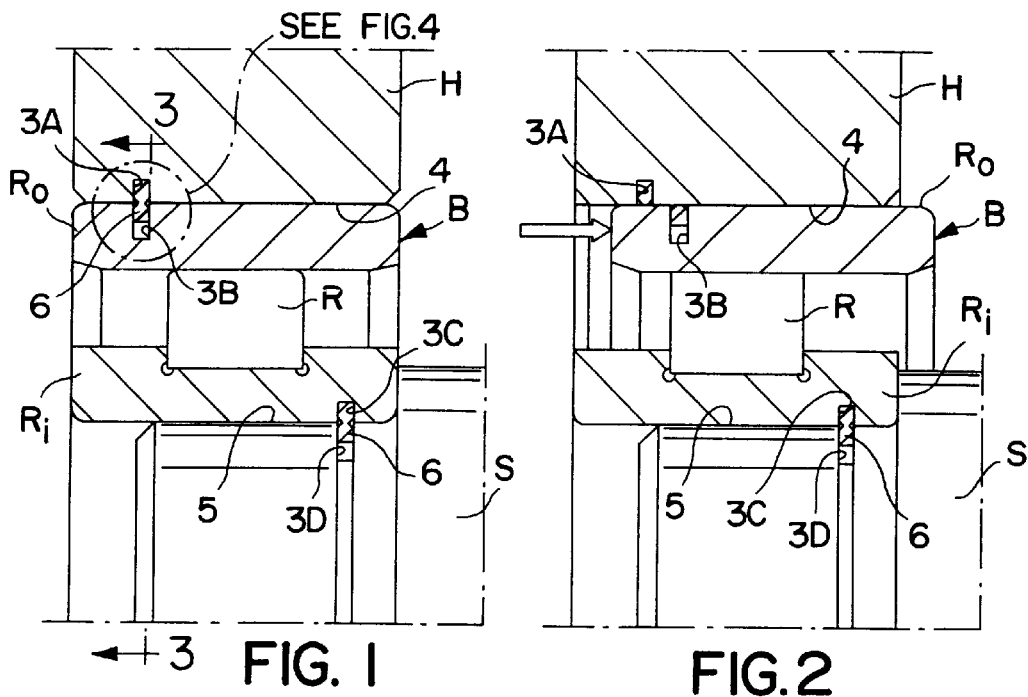
FIG. 1 is a partial longitudinal cross-sectional view through a cylindrical roller bearing assembly wherein the parts are locked in place by means of spring rings which engage in complementary grooves in the shaft and in a housing bore in accordance with the present invention.
FIG. 2 is a view similar to FIG. 1 but showing the locking arrangement between the housing bore and the outer ring of the bearing being broken for removal of the bearing from the housing.

Referring now to the drawings and particularly FIG. 1 thereof, there is illustrated a cylindrical roller bearing assembly generally designated by the letter "B" which comprises the usual inner and outer rings Ri and Ro and a plurality of rollers R in the annular space between the rings. In the present instance, the outer ring Ro is mounted in the bore 4 of a housing H and the inner ring Ri confronts and seats on the peripheral surface 5 of the shaft S. The outer ring Ro and housing H have aligned circumferentially extending grooves 3A and 3B, respectively and the inner ring Ri and shaft S have circumferentially extending aligned complementary grooves 3C and 3D.

Figure 4:
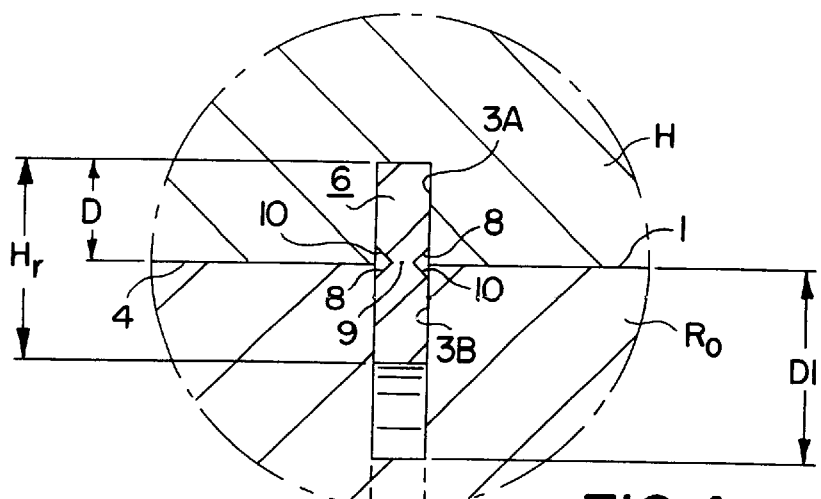
FIG. 4 is a greatly enlarged fragmentary sectional view of the detail contained within the dot and dash circle of FIG. 1 and designated FIG. 4 showing details of the spring ring in locking engagement between the housing and the outer ring of the bearing.

Spring rings 6 are mounted in the grooves 3A, 3B, 3C and 3D in the manner shown in FIG. 1 to hold the parts in place against axial displacement. As illustrated, and clearly shown in FIG. 4 all of the radial grooves 3A, 3B, 3C and 3D have rectangular profiles of a predetermined width to accept the thickness of the spring rings 6 inserted therein. The depth D of the radial groove 3A in the housing bore 4 and the groove 3C in the inner ring Ri are equal to half the radial height Hr of the spring rings 6. The depth Dl of the radial grooves 3B in the outer ring and of the groove 3D of the shaft 5 is equal to the total radial height Hr of the spring rings 6.

Figure 3:
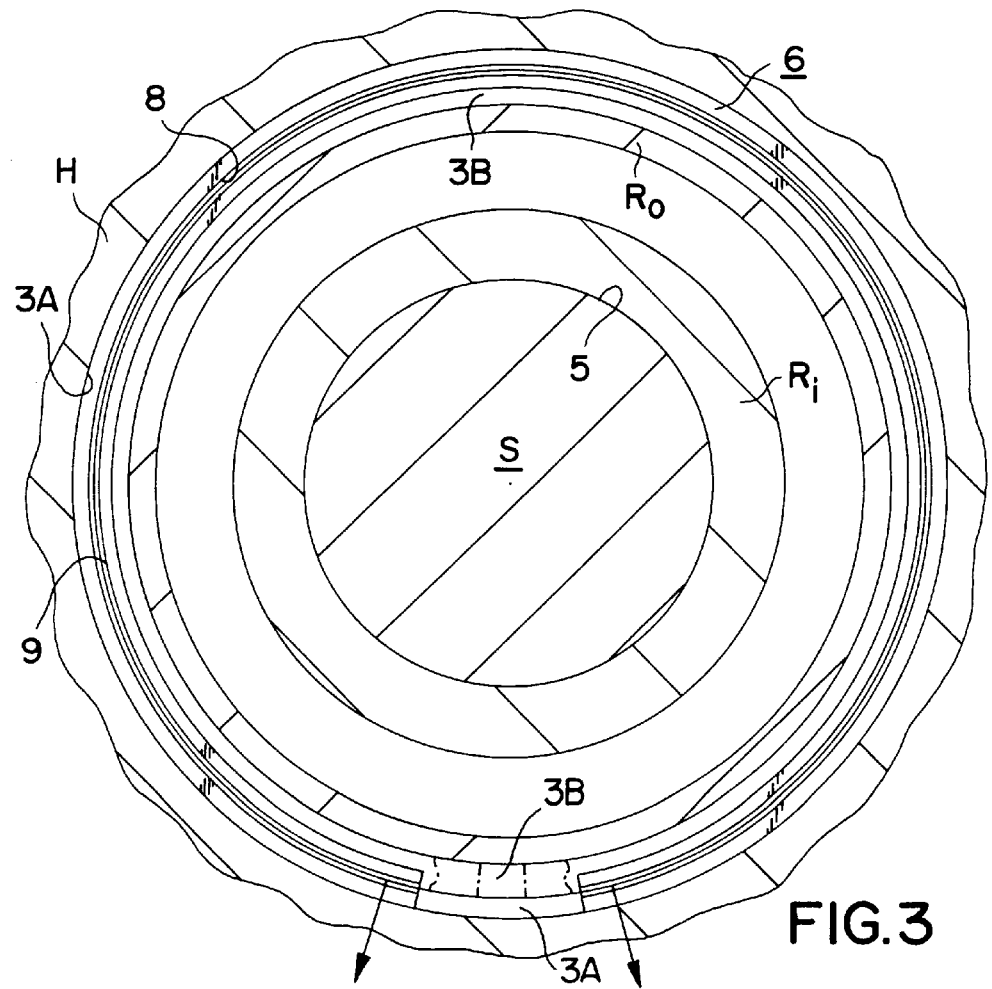
FIG. 3 is a sectional view taken on the line 3,3 of FIG. 1 showing the interengagement of the outer ring of the bearing, the locking spring ring and the housing in an interlocked mode.
Figure 6:
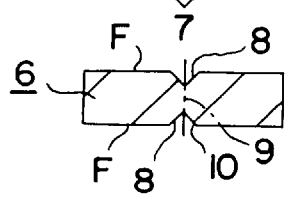
FIG. 6 is enlarged sectional view taken on the line 6,6 of FIG. 5.

In accordance with the present invention, the spring rings 6 have a slot 7 at a predetermined point on the circumference to allow for radial expansion and contraction of the ring and thereby allow for displacement of the ring in a radial direction. In FIG. 6, the spring ring 6 used in the outer bearing ring in the manner shown in FIG. 1 is illustrated in the resting position. Note that it is extended radially outwardly, and in this configuration has a wider slot 7 than shown in FIG. 3.

Figure 5:
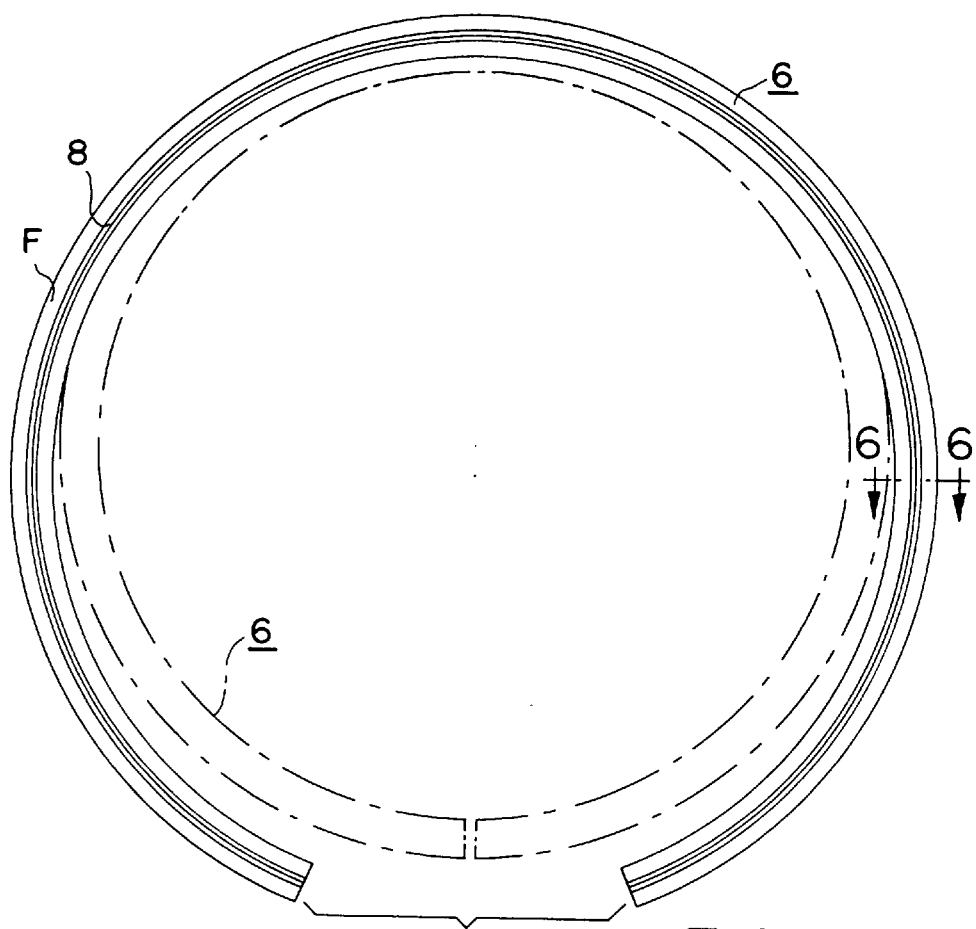
FIG. 5 is an elevational view of the spring ring used between the housing and the outer ring of the bearing, shown in full line in a relaxed state and in dot and dash outline showing the spring ring in its most compressed mode when fully recessed within the groove of the outer ring prior to installation.

In accordance with the present invention, the spring rings are configured in such a way to define predetermined ring-shaped, breaking points, generally designated by the numeral 9. In the embodiment illustrated in FIGS. 4, 5 and 6, the V-shaped grooves are provided in the opposing circumferentially extending annular side faces F of the spring rings 6, which extend inwardly and leave a reduced thickness in material between the bottoms of the V-shaped grooves 8 so formed. The spring ring 6 in the radial groove 3B of the outer ring is also in the outwardly extended position shown before the cylindrical roller bearing is introduced into housing bore 4.

Considering now assembly of the elements of the bearing assembly shown in FIG. 1. The spring ring 6 is initially assembled in the circumferentially extending groove 3B in the outer peripheral surface of the outer ring Ro. As the outer ring Ro is pushed axially, inwardly into the housing H, spring ring 6 is pushed radially inwardly. Its entire radial height Hr is displaced inwardly to completely nest in radial groove 3B so that the outer peripheral surface of the ring is flushed with the lateral peripheral surface 1 of the outer ring Ro. When the spring ring 6 is thus compressed, the slot 7 shown in FIG. 2 closes. When spring ring 6 reaches radial groove 3A and the housing is aligned with radial groove 3A in the housing bore 4, it snaps into the groove 3A by its intrinsic tension and rests with its outside surface against the bottom of the groove in the manner shown in FIG. 1. In this position, half the depth of the groove 3B in the outer ring Ro becomes free again and ring-shaped V-grooves 8 are located in the intersecting plane of the outer peripheral surface of the outer ring and bore surface of the housing. With the ring in this position, the outer ring Ro of the bearing is locked against displacement in the axial direction relative to the housing bore 4.

When it is desired to release the axial locking arrangement as shown in FIG. 2, the outer ring Ro may be removed from the housing bore 4 by pressing or striking the outer ring Ro in the axial direction. The edges or sides of the radial grooves 3 function as a shearing tool to break spring ring 6 in the area of predetermined breaking point 9 between the two ring-shaped, V-grooves 8. The dimensions of the predetermined breaking point 9 are calculated in such a way that the breaking force does not cause any damage to radial grooves 3. Flanks 10 of the V-shaped grooves prevent the undesirable situation in which broken spring 6 could lock itself in radial grooves 3 creating ramps up which the edges of radial groove 3 can ascend. The halves of spring ring 6 can easily be removed from radial grooves 3.

The axial locking and disassembly procedures in the area of the inner ring are carried out in a similar manner.

Figure 7:
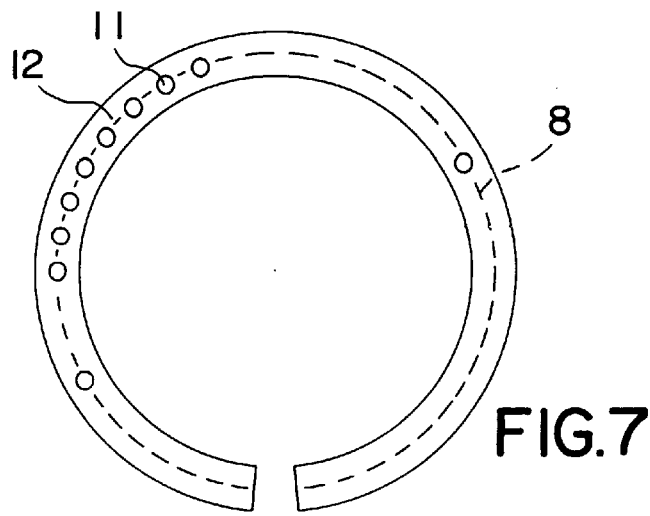
FIG. 7 is a side elevational view of the spring ring with holes along the ring shaped predetermined breaking point.

FIG. 7 shows a modified embodiment of the present invention wherein additional weakening is provided by closely spaced, circumferentially extending holes 11. The webs 12 remaining between the holes 11 are provided with a ring-shaped groove 8 as illustrated in FIGS. 1–6. The required breaking load for disassembly is considerably reduced as a result of the holes 11. In addition, it is also possible to provide ring-shaped slots, material breaks, etc., instead of holes 11.

Figure 8:
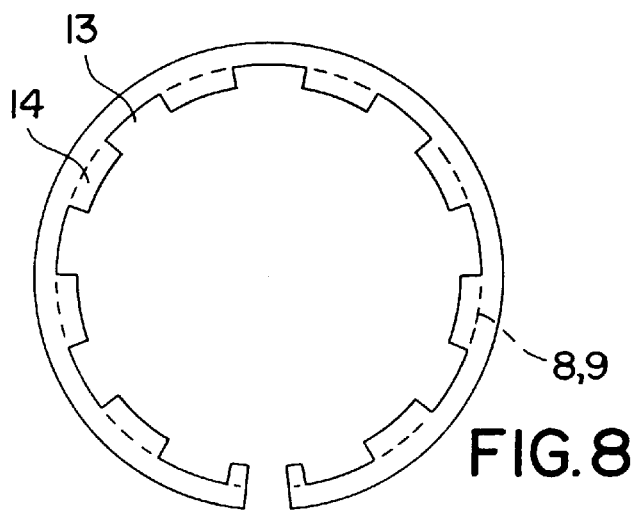
FIG. 8 is a side elevational view of a spring ring in accordance with the present invention with radially, inwardly facing breaking segments.
Figure 9:
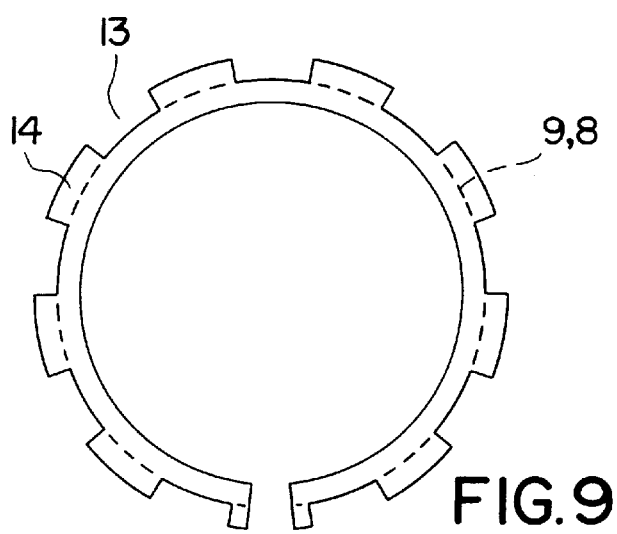
FIG. 9 is a side elevational view of another embodiment of a spring ring in accordance with the present invention with radially, outwardly facing breaking segments.

FIGS. 8 and 9 show another embodiment of the present invention wherein half of the height H of the spring ring 6 situated in one of the two radial grooves is provided with breaks 13. As a result, tongue-like sections 14 remain, which mean that the length of the circumference line available for axial locking is decreased approximately by half, but at the same time the total length of the predetermined breaking point 9 is reduced. In the area of tongue-like sections 14, ring-shaped groove sections 8 are also provided which decrease the breaking load of the predetermined breaking point 9.

Even though particular embodiments of the invention have been illustrated and described herein, it is not intended to limit the invention and changes and modifications may be made therein within the scope of the following claims.

What is claimed is:

1. A locking mechanism for machine parts having aligned grooves comprising a spring ring engageable in at least two radial grooves, one of the grooves having a predetermined depth D, in the machine part in a locking position and wherein the material of the spring ring is weakened continuously in a circumferential direction at a juncture between the machine parts to define a predetermined breaking point;

the radial height of the spring ring being equal to the depth D of one of the radial grooves, and wherein the spring ring springs by virtue of its intrinsic elasticity into the other radial groove of being a depth less than the depth D of the one radial groove;

a ring-shaped indentation is formed in at least one side surface of the spring ring to define a fracture zone.

2. A locking mechanism according to claim 1, characterized in that said indentation has a V-shaped cross section.

3. A locking mechanism according to claim 2, characterized in that indentations are provided on opposing side surfaces of the spring ring.

4. A locking mechanism according to claim 3, characterized in that holes are provided around the circumference.

5. A locking mechanism according to claim 2, characterized in that part of the height of the ring has breaks extending radially all the way to the bore diameter and with tongue-like sections remaining between them.

* * * * *